April 20, 1926.
G. P. HUTCHINS
CABINET
Filed August 4, 1923    2 Sheets-Sheet 1
1,581,267
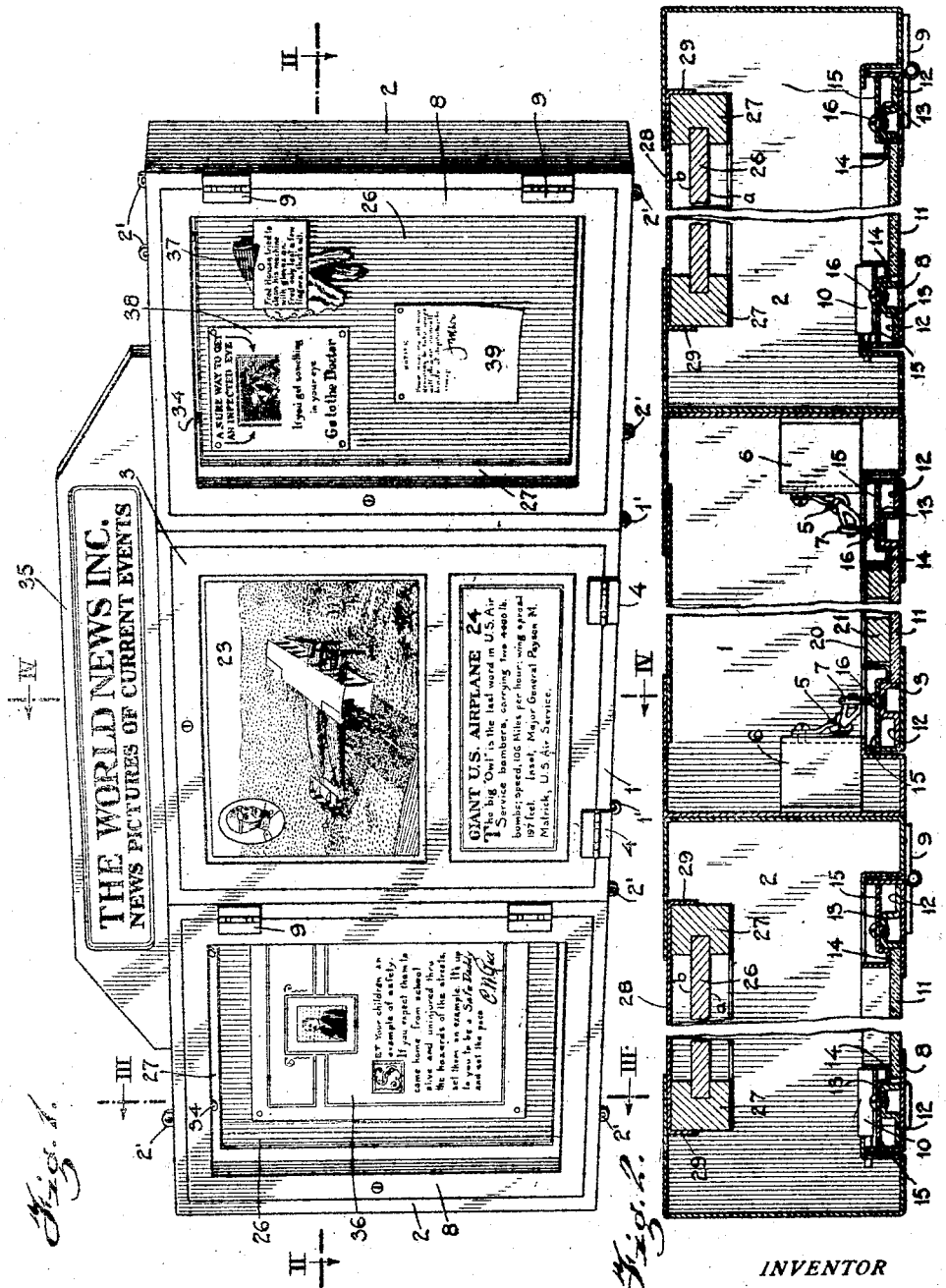
INVENTOR
BY George P. Hutchins
Jeffrey, Kimball & Eggleston
ATTORNEYS April 20, 1926.

G. P. HUTCHINS

CABINET

Filed August 4, 1923   2 Sheets-Sheet 2

INVENTOR
George P. Hutchins
BY
Jeffery, Kimball & Eggleston
ATTORNEYS

Patented Apr. 20, 1926.

1,581,267

UNITED STATES PATENT OFFICE.

GEORGE P. HUTCHINS, OF NEW YORK, N. Y., ASSIGNOR TO ELLIOTT SERVICE COMPANY, OF NEW YORK, N. Y., A CORPORATION OF NEW YORK.

CABINET.

Application filed August 4, 1923. Serial No. 655,605.

*To all whom it may concern:*

Be it known that I, GEORGE P. HUTCHINS, United States citizen, residing in New York city, New York, have invented the following described Improvements in Cabinets.

My invention relates to a combined bulletin board and display cabinet designed for use in industrial plants to improve the morale of the workmen by arousing interest and to accomplish the difficult feat of educating them to the requirements of safety and to the dangers of carelessness and imprudence. The cabinet first attracts and then teaches and to that end combines means for displaying a visual lure (usually a picture of some current event of interest) with means for displaying adjacent said lure three-dimensional and other educational exhibits, which are of a concrete and familiar character readily understood by the men, such as broken or dangerous tools, goggles, gloves, shoes, etc. as well as pictures showing unsafe actions, and safety posters and notices generally. Such exhibits, especially three dimensional articles, hold the interest of the men once they have been attracted to the cabinet by the visual lure, and an effective educational campaign along safety lines can thus be carried on from day to day even among workmen unable to read. Whereas without such a visual lure avowedly educational notices and bulletins would be little regarded.

The cabinet which is of pleasing appearance and of a simplicity adapting it for commercial production is provided with adjacent sections, each of which has a panel board, one carrying the visual lure at the front of the section and the other, the three-dimensional articles and other exhibits in space provided in its section for that purpose, both the visual lure and any descriptive printed matter pertaining to it, and the safety exhibits being removable and replaceable by others to keep the appeal current.

Various special features of novelty and advantage will appear in the detailed description following.

In the drawings:—

Fig. 1 is a perspective view of the preferred embodiment of my invention;

Fig. 2, is a horizontal section on line II—II, Figure 1.

Figure 3:
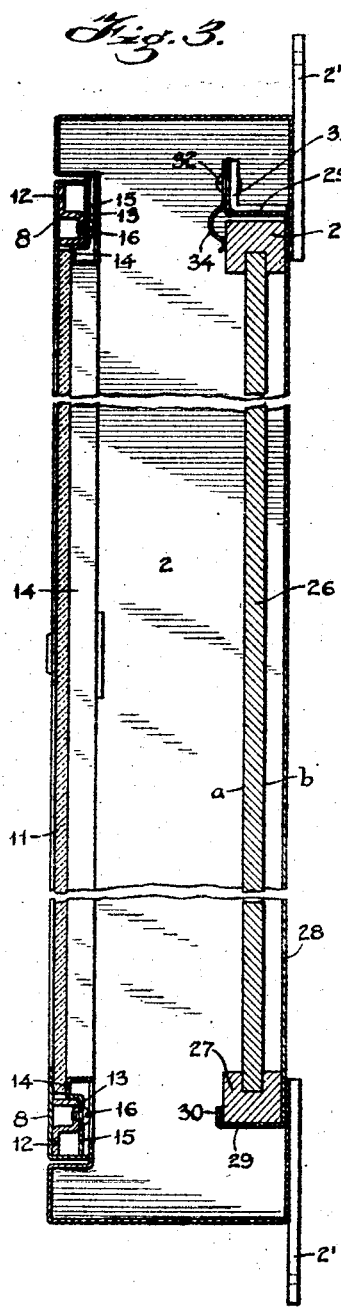
Fig. 3 is a vertical section on line III—III, Figure 1.
Figure 4:
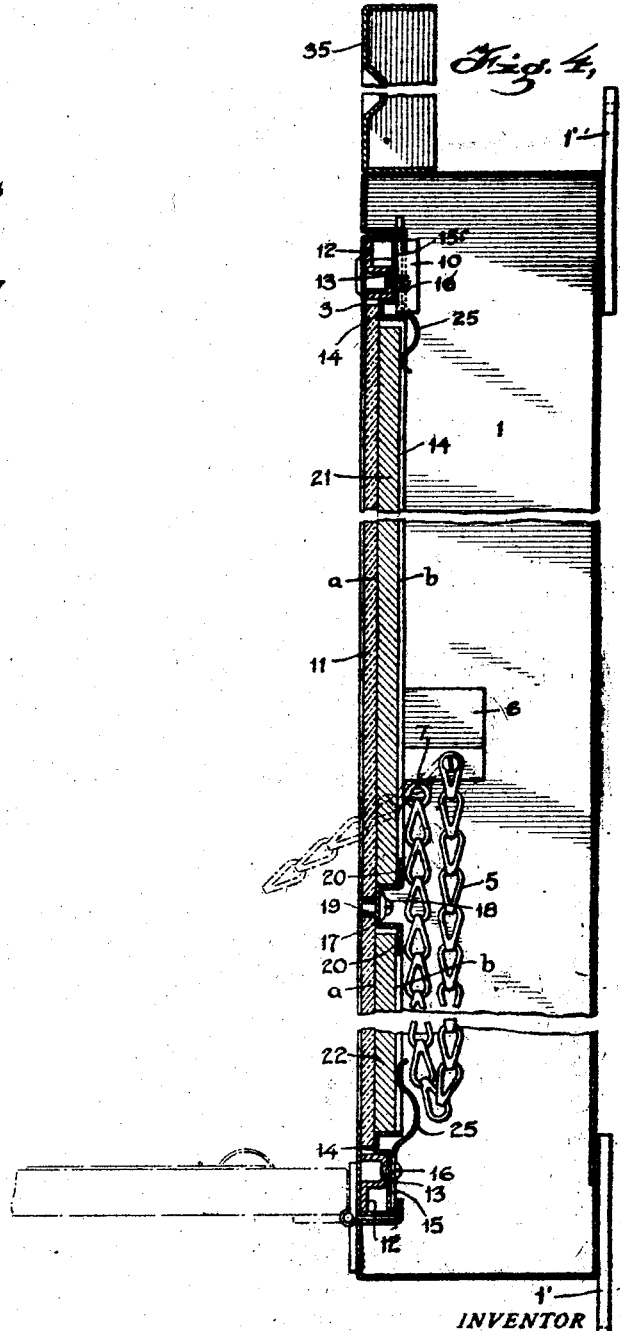
Fig. 4 is a vertical section on line IV—IV, Figure 1.

I prefer, as in the bulletin board illustrated in the drawings, to provide sheet metal sections, each of which is a separate and complete unit which may be secured by any suitable means to the adjacent section or sections in alinement therewith, and to employ three of these sections, a central section 1 and outer sections 2, each provided at top and bottom with its own pair of attachment lugs 1', 1', 2', 2', the central section having a glazed drop door 3, hinged at 4 to the frame of the section, and suspended when dropped to the horizontal (as indicated in dotted lines in Figure 4) by side chains 5, one end of which is anchored to angle iron brackets 6 secured to each side of this section, and the other connected to the door by screw eyes 7 carried thereby. Each outer section 2 has a glazed door 8 mounted on side hinges 9. Each of the doors is conveniently provided with a lock 10. Each of the doors closes on a shoulder on its section in the ordinary way. Desirable means for retaining the glass 11 in place is illustrated and as shown is substantially the same for all three of the doors. It consists of filler strips 12 riveted or otherwise secured to the door frame and channeled to form rearwardly extending ribs 13 overlapped by and in contact with the side of forwardly extending ribs 14 of less height formed on channelled sheet metal topping strips 15 secured to the ribs of the filler strips as by screws 16 and clamping the edges of the glass sheet between the face of the ribs 14 and the inside of the door frame in the space resulting from the disparity in height of the respective ribs. The inner side of the ribs 14 extends in planes perpendicular to the front of the door frame, thereby completely defining a space just behind the glass in the doors 8, and defining three sides of such a space behind each of the two openings in the door 3 of the center section, the fourth side being defined by the double angular topping strip 17 secured by screws 18 to a horizontal filler strip 19 and having vertical or transverse flanges 10. The spaces thus defined just behind the glass of the door 3 of the central section serve to receive the panel boards 21, 22 which are preferably removable and reversible and provided with a thumb-tack-receiving surface a, (which may be felt-covered) on one side and with a blackboard surface b on the other. They serve as a convenient and preferred means for removably displaying just behind the glass the visual lure 23 and the descriptive matter 24 associated therewith. These panel boards may be secured in any convenient way, but it is best to so mount them that they are resiliently pressed against the glass as by a pair of symmetrically arranged spring clips 25 carried by the door frame at points opposite the angular topping strips 17, and which may readily be secured by the same screws 16 which fasten the topping strip to the filler strips. The section or sections associated with the visual-lure-displaying section may be described as cupboard-sections, since they provide compartments or space in which may be displayed three-dimensional articles constituting safety exhibits. The most convenient way in which this can be done is by the provision of removable panel boards 26, which, like the panel boards 21 and 22 are preferably reversible as well as removable and are provided on one side with a relatively soft thumb-tack-receiving surface a, preferably covered with felt, and on the other with a blackboard surface b. It is desirable to mount these panels in frames 27 and the framed panels are carried by the respective casings at a point well to the rear of the glass of their doors, thus providing the requisite display space. One of the various modes in which these panels may be supported is shown in the drawings, in which a sheet metal panel board holder 28 provided with forwardly extending flanges 29 at its sides and bottom forms part of the backs of the respective sections. The horizontal flange 29 at the bottom of the panel holder 28 terminates in a vertical flange 30 overlapping the frame 27, and at the top with a vertical flange or with tabs 31, to which may be secured, by screws 32 taking into strengthening angle pieces 33, spring clips 34 of suitable width, two symmetrically placed being sufficient.

A name plate 35 symmetrical with reference to the central vertical axis of the center section and mounted on top of the associated sections flush with their fronts gives an agreeable and harmonious finish to the cabinet.

It will be understood that the lure-displaying panel may be readily removed for purposes of substituting a different picture by letting down the drop door 8 of the central section 1 and releasing the panel, for which purpose the spring clips may be turned on their securing screws out of the way of the panels. Opening the doors of the outer cabinets gives ready access to the exhibit-displaying panels 26, which may be removed in the same way as the panel boards 21, 22, but which need not be removed in order to permit substitution of new articles or posters for those already in place.

The visual lure illustrated in the drawing is a picture of an aeroplane of current interest identified by the descriptive matter below it. In one of the outer cupboard-sections 2 is a safety leaflet 36 presenting a safety sentiment by a well known author or other notable person whose picture and facsimile signature are associated therewith. The other carries as a safety exhibit a mutilated glove 37 with descriptive matter warning against carelessness in its use. The poster 37 at the left of the glove, pictures a workman with dirty hands endeavoring to get something out of the eye of a fellow workman. The accompanying caption "A sure way to get an infected eye" and the advice—"If you get something in your eye go to the doctor" drive home the moral. A notice 39 is also displayed. The great variety of exhibits, posters, notices, orders, etc., which can in this way be brought to the attention of the great body of workmen, not only as a formal matter, but in such a way as to reach their understanding and affect their conduct, will be apparent.

Claims—

1. A combined bulletin board and display cabinet having aligned cupboard-sections, the central section being provided with a glazed drop door and with side supporting chains therefor anchored to the frame of the section, and the outer or flanking sections each having a side-hinged glazed door, a removable panel board in each of said sections, the panel board of the central section being located just behind the glass of its door and the panel boards of the outer sections being spaced rearward from the glass of their respective doors to provide room for the display of three-dimensional articles removably secured thereon.

2. A combined bulletin board and display cabinet having aligned contiguous cupboard-sections, the central section being provided with a glazed drop door hinged at its bottom and provided with side supporting chains therefor anchored to the frame of the section, and the outer or flanking sections each having a side-hinged glazed door, a removable and reversible panel board in each of said sections, each such board having a blackboard surface on one side and a poster carrying surface on the other, the panel board of the central section being located just behind the glass of its door, and the panel boards of the outer section being spaced rearward from the glass of their respective doors to provide room for the display of three-dimensional articles removably secured thereon, and spring clips for removably retaining said several panel boards in place.

3. In a cabinet, a sheet metal section having a glazed door, sheet metal filler strips and separate topping strips fastened thereto and securing the glass in place and defining a space just behind the glass, and removable without disturbing the filler strip, a panel board located in this space, and means on the door frame structure for securing the panel board removably in place.

4. In a cabinet, a sheet metal section having a glazed door, sheet metal filler strips mounted in the door frame and channelled to form a rearwardly projecting rib adjacent the edge of the glass, and sheet metal topping strips secured to the filler strips and channelled to form a forwardly projecting rib of less height than the rib on the filler strip and overlapping and in contact with the side of the filler strip rib thus leaving space between the topping strip rib and the door frame in which the glass is clamped, one side of the topping strip rib being extended perpendicular to the door frame and defining a space just behind the glass, and a panel board removably secured therein.

5. A combined bulletin board and display cabinet comprising associated sheet metal sections each provided with a hinged glazed door, overlapping sheet metal filler strips and topping strips securing the glass in place in the metal door frames and defining a space just behind the glass, a panel board located in this space in the center section and spring clips mounted on the door frame structure for securing the panel board removably in place.

6. In a wall cabinet, a sheet metal section having a hinged door whose frame is provided with two display openings, sheet metal strips for spacing and securing glass in these openings, said strips defining a space in rear of each of said display openings, and panel boards removably mounted in each of said spaces and adapted to carry poster material.

7. In a wall cabinet, a sheet metal section having a glazed door whose frame is provided with two glass covered display openings, sheet metal filler strips and topping strips enclosing the glass except on the common or adjacent sides and defining a space just in rear of the glass by flanges perpendicular to the front of the door and a double sheet metal angle strip secured between said openings defining the third side of each of said spaces and having a transverse flange extending inward in rear of said space, a removable panel board mounted in each of said spaces, and spring clips secured to the door frame at points opposed to said transverse flanges for removably securing said panel boards.

8. In a display cabinet, a sheet metal section having a closed front and spaced a material distance in rear thereof, a sheet metal panel holder having flanged bottom and sides and a removable panel board mounted in a frame adapted to be retained in said flanged portions of the holder, and spring means for releasably securing the panel in the holder, said panel being adapted to display three-dimensional and other articles in the space between itself and the glass of the section.

In testimony whereof, I have signed this specification.

GEORGE P. HUTCHINS.